US012652158B2

(12) United States Patent
Shah

(10) Patent No.: US 12,652,158 B2
(45) Date of Patent: Jun. 9, 2026

(54) SYSTEM FOR MANAGEMENT OF REWARDABLE COMPUTER-CONTROLLED CONTENT BLOCKS DELIVERY AND CONSUMPTION

(71) Applicant: Intellectual Frontiers LLC, Silver Spring, MD (US)

(72) Inventor: Shahid N. Shah, Silver Spring, MD (US)

(73) Assignee: Intellectual Frontiers LLC, Silver Spring, MD (US)

( * ) Notice: Subject to any disclaimer, the term of this patent is extended or adjusted under 35 U.S.C. 154(b) by 0 days.

(21) Appl. No.: 18/822,384

(22) Filed: Sep. 2, 2024

(65) Prior Publication Data

US 2024/0421978 A1 Dec. 19, 2024

Related U.S. Application Data

(62) Division of application No. 17/149,482, filed on Jan. 14, 2021, now Pat. No. 12,155,747.

(51) Int. Cl.
*G06Q 30/00* (2023.01)
*G06F 3/01* (2006.01)
(Continued)

(52) U.S. Cl.
CPC ............ *H04L 9/0643* (2013.01); *G06F 3/013* (2013.01); *G06N 20/00* (2019.01);
(Continued)

(58) Field of Classification Search
None
See application file for complete search history.

(56) References Cited

U.S. PATENT DOCUMENTS 8,793,575 B1 7/2014 Lattyak et al.
9,207,762 B2 12/2015 Tsou et al.
(Continued)

FOREIGN PATENT DOCUMENTS

WO WO-2015001549 A1 * 1/2015 ............. G09B 17/02

OTHER PUBLICATIONS

"This French school is using facial recognition to find out when students aren't paying attention"—Amar Toor https://www.theverge.com/2017/5/26/15679806/ai-education-facial-recognition-nestor-france (Year: 2017).
(Continued)

*Primary Examiner* — Christopher Stroud
(74) *Attorney, Agent, or Firm* — Rahman LLC

(57) ABSTRACT

A system for monitoring consumption of digital content by a user includes a display device, a memory circuit maintained on one or more non-transitory computer-readable media, and a processing circuit. The processing circuit identifies the progress of the user through the digital content presented on the display device. The digital content includes a collection of micro content blocks, the progress of the user being at least dependent on one or more of a plurality of predefined parameters. The processing circuit identifies a computer-executable progress score of the user based on the progress identified for the user and defines a computer-executable reward value for the user based on the progress score of the user upon successful achieving at least a defined level of the progress. The processing circuit allows the user to redeem the computer-executable reward value as an equivalent transactional amount upon submission of the progress.

13 Claims, 6 Drawing Sheets

(51) Int. Cl.

| | |
|---|---|
| *G06N 20/00* | (2019.01) |
| *G06Q 20/36* | (2012.01) |
| *G06Q 30/0217* | (2023.01) |
| *G06V 40/16* | (2022.01) |
| *G09B 5/12* | (2006.01) |
| *H04L 9/06* | (2006.01) |
| *H04L 9/32* | (2006.01) |
| *H04L 9/00* | (2022.01) |

(52) U.S. Cl.
   CPC ..... *G06Q 20/3678* (2013.01); *G06Q 30/0218* (2013.01); *G06V 40/174* (2022.01); *G09B 5/12* (2013.01); *H04L 9/3263* (2013.01); *H04L 9/50* (2022.05)

(56)         References Cited

U.S. PATENT DOCUMENTS

| | | | |
|---|---|---|---|
| 9,715,482 B1 | 7/2017 | Bjorkegren | |
| 10,180,716 B2 | 1/2019 | Feng et al. | |
| 11,113,987 B1 * | 9/2021 | Jaggers | G09B 5/04 |
| 11,238,749 B2 * | 2/2022 | Jang | G06F 16/9027 |
| 11,533,272 B1 * | 12/2022 | Sastry | H04L 9/50 |
| 2004/0015329 A1 * | 1/2004 | Shayegan | G09B 23/28 |
| | | | 702/179 |
| 2006/0256083 A1 | 11/2006 | Rosenberg | |
| 2009/0226871 A1 | 9/2009 | Etuk et al. | |

| | | | |
|---|---|---|---|
| 2011/0262887 A1 | 10/2011 | Cleveland | |
| 2012/0094757 A1 * | 4/2012 | Vago | A63F 13/327 |
| | | | 463/31 |
| 2014/0019136 A1 | 1/2014 | Tanaka | |
| 2014/0040946 A1 * | 2/2014 | Gates, III | H04N 21/812 |
| | | | 725/34 |
| 2014/0272847 A1 * | 9/2014 | Grimes | G09B 7/08 |
| | | | 434/236 |
| 2015/0120816 A1 | 4/2015 | Bertelsen | |
| 2015/0170115 A1 | 6/2015 | Lacek | |
| 2016/0147298 A1 | 5/2016 | Flawn | |
| 2017/0103472 A1 | 4/2017 | Shah | |
| 2017/0228774 A1 | 8/2017 | Sallas et al. | |
| 2018/0121973 A1 | 5/2018 | DiMascio et al. | |
| 2019/0378621 A1 | 12/2019 | Ellison | |
| 2020/0327821 A1 * | 10/2020 | Holzheimer | G09B 5/00 |
| 2022/0032938 A1 | 2/2022 | Liu et al. | |

OTHER PUBLICATIONS

"Chinese school uses facial recognition to make kids pay attention"—Rachel England https://www.engadget.com/2018-05-17-chinese-school-facial-recognition-kids-attention.html (Year: 2018).

"Relationship between Visual Attention and Flow Experience in a Serious Educational Game: An Eye Tracking Analysis," Wai Ki Rebecca Cheng https://mars.gmu.edu/items/e1045c8e-2906-4ebd-a946-1a32321d30f1 (Year: 2014).

* cited by examiner

FIG. 3

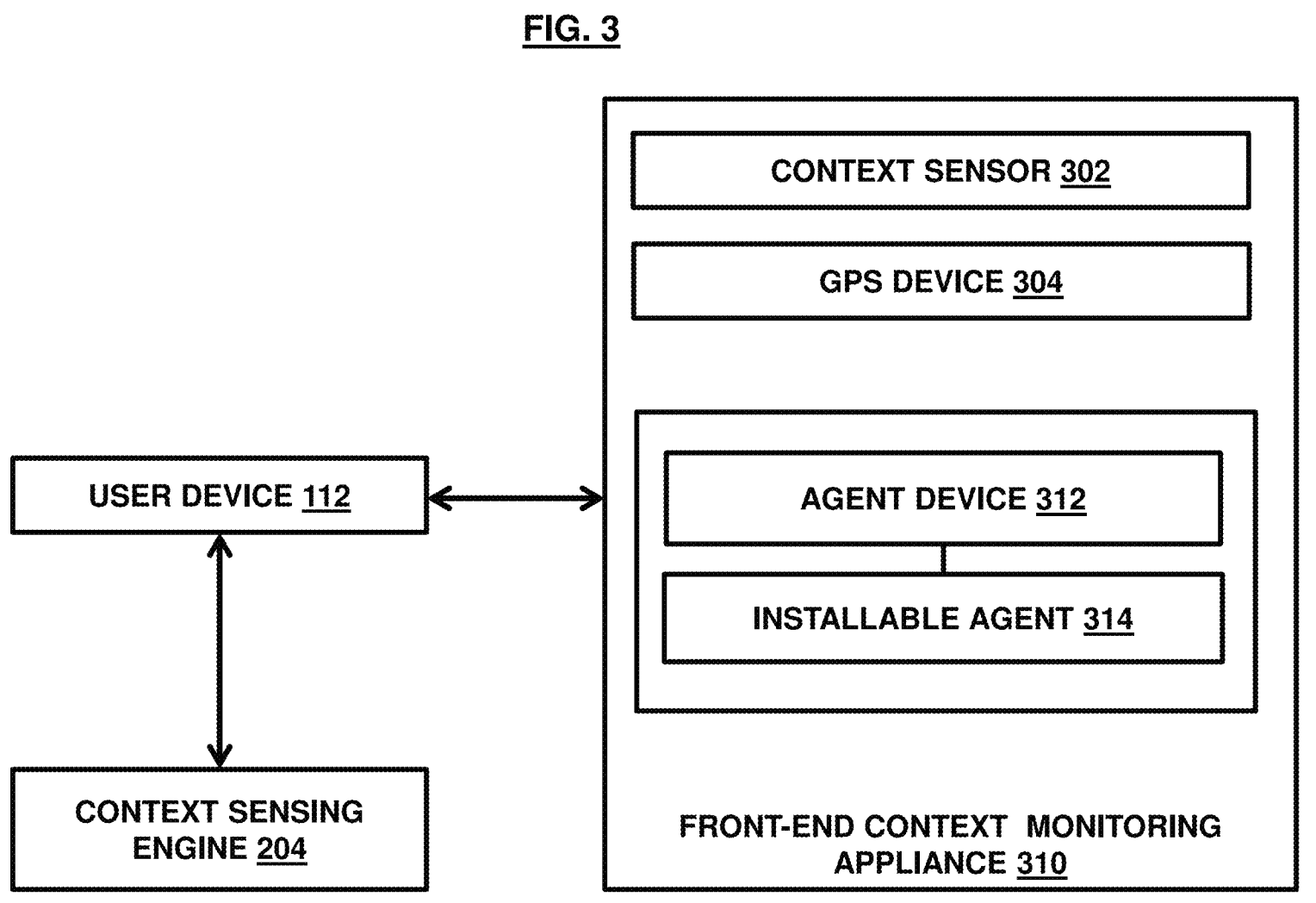

CONTEXT SENSOR 302

GPS DEVICE 304

AGENT DEVICE 312

INSTALLABLE AGENT 314

FRONT-END CONTEXT MONITORING APPLIANCE 310

USER DEVICE 112

CONTEXT SENSING ENGINE 204

FIG. 4

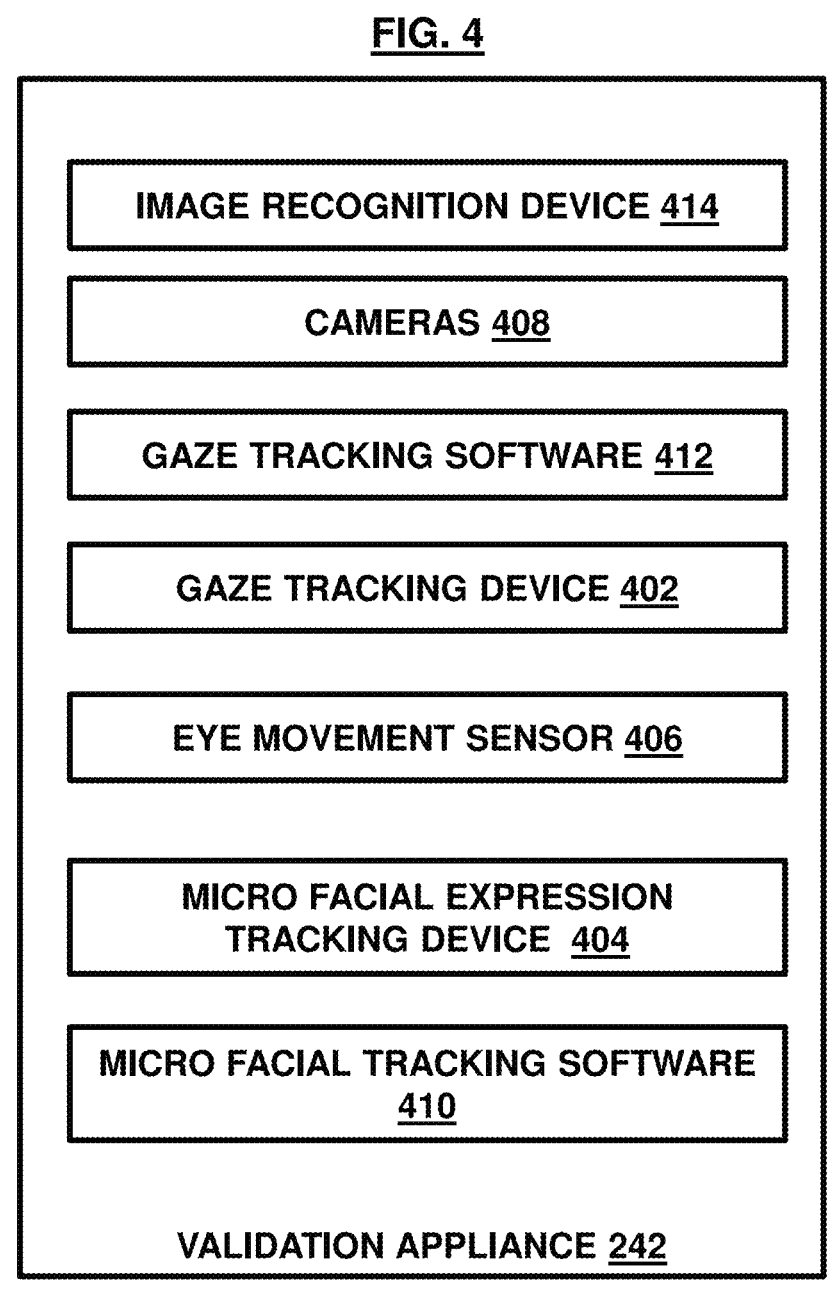

IMAGE RECOGNITION DEVICE 414

CAMERAS 408

GAZE TRACKING SOFTWARE 412

GAZE TRACKING DEVICE 402

EYE MOVEMENT SENSOR 406

MICRO FACIAL EXPRESSION
TRACKING DEVICE  404

MICRO FACIAL TRACKING SOFTWARE
410

VALIDATION APPLIANCE 242

Figure 6:
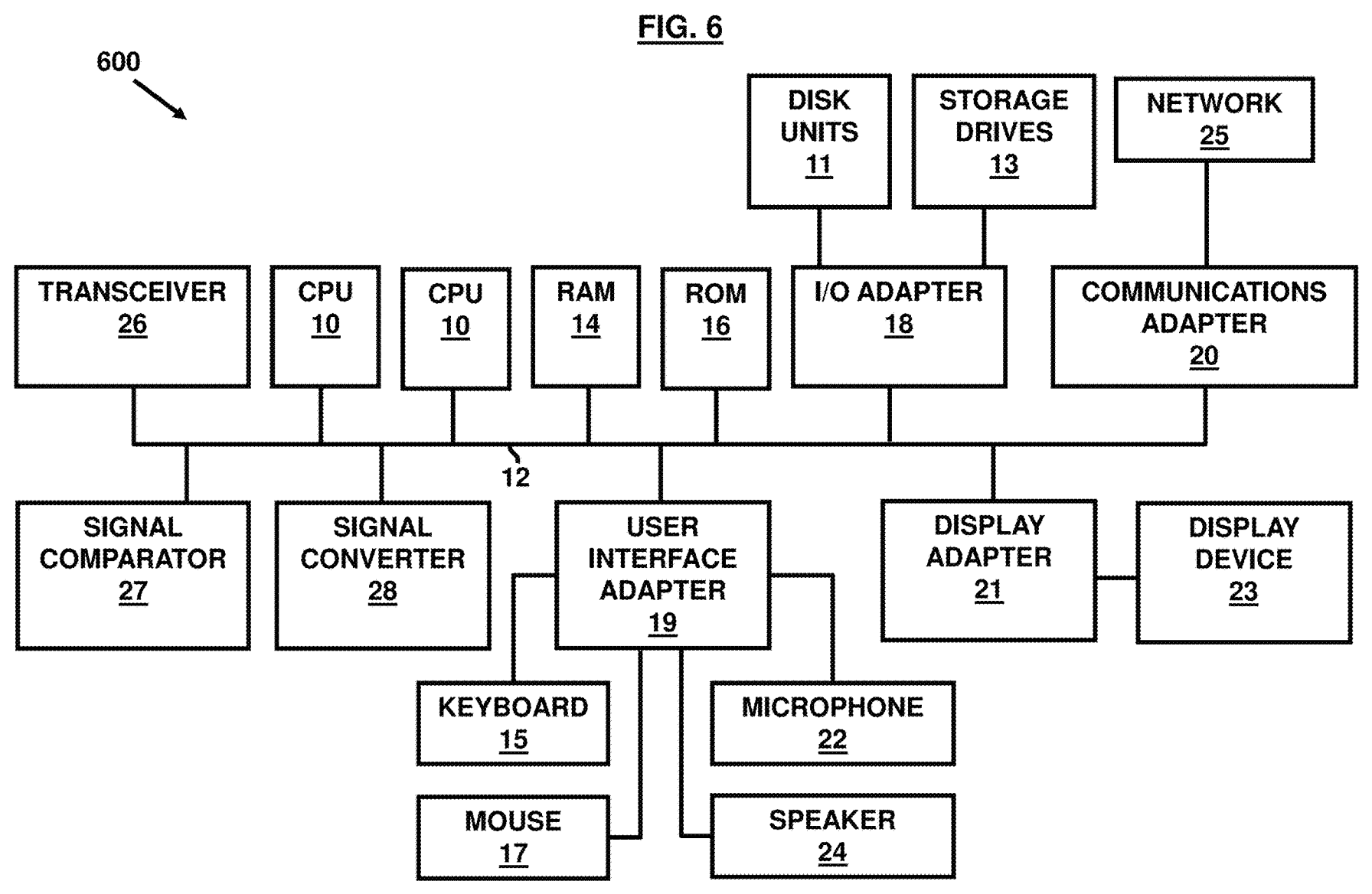

| Block | Number |
|---|---|
| NETWORK | 25 |
| COMMUNICATIONS ADAPTER | 20 |
| DISPLAY DEVICE | 23 |
| STORAGE DRIVES | 13 |
| DISK UNITS | 11 |
| I/O ADAPTER | 18 |
| DISPLAY ADAPTER | 21 |
| ROM | 16 |
| RAM | 14 |
| CPU | 10 |
| CPU | 10 |
| TRANSCEIVER | 26 |
| USER INTERFACE ADAPTER | 19 |
| MICROPHONE | 22 |
| SPEAKER | 24 |
| KEYBOARD | 15 |
| MOUSE | 17 |
| SIGNAL CONVERTER | 28 |
| SIGNAL COMPARATOR | 27 |
| 12 | |

SYSTEM FOR MANAGEMENT OF REWARDABLE COMPUTER-CONTROLLED CONTENT BLOCKS DELIVERY AND CONSUMPTION

CROSS-REFERENCE TO RELATED APPLICATIONS

This application claims priority to U.S. patent application Ser. No. 17/149,482 filed on Jan. 14, 2021, the complete disclosure of which, in its entirety, is hereby incorporated by reference.

BACKGROUND

Technical Field

The embodiments herein generally relate to computerized Internet-based education and training systems, and more particularly to systems and method for computer-controlled management and remuneration of remote-based learning.

Description of the Related Art

Schools are a great way of learning and training. However, several modern technology requirements and environments for training systems are dependent on its context and reference. This means someone may not need to be taught everything in all possible ways. The context demands at least some level of customization for the training and education delivery process in a digital environment and providing remuneration thereof to those who consume information/education. Therefore, there is a need of a new intelligent and evolved digital system for education and training and allowing users to be remunerated from it.

SUMMARY

An embodiment disclosed herein includes a system for monitoring consumption of digital content by a user, the system comprising a display device; a memory circuit maintained on one or more non-transitory computer-readable media; and a processing circuit that monitors the consumption of the digital content by: identifying a progress of the user through the digital content presented on the display device, wherein the digital content comprises a collection of micro content blocks, the progress of the user being at least dependent on one or more of a plurality of predefined parameters; identifying a computer-executable progress score of the user based on the progress identified for the user; defining a computer-executable reward value for the user based on the progress score of the user upon successful achieving at least a defined level of the progress; and instructing the user to redeem the computer-executable reward value as an equivalent transactional amount upon submission of the progress.

The plurality of predefined parameters comprises a number of words read by the user, a number of characters read by the user, and an amount of time spent by the user in front of the micro content blocks. The system comprising a validation appliance that assesses a computer-executable genuineness score associated with consumption of the digital content by the user. The validation appliance comprises a gaze tracking device for continued tracking of gaze of the user through the digital content. The validation appliance comprises a micro facial expression tracking device for continued monitoring of micro facial expressions of the user through the progress of the digital content.

The micro facial expression tracking device comprises a micro facial tracking software to help process movement of facial expressions. The computer-executable genuineness score is indicative of an extent of attention paid by the user while going through the digital content such that a higher computer-executable genuineness score is indicative of a higher reward value for the user. The processing circuit monitors the consumption of the digital content by defining at least one of credits, tokens, and redeemable points for each type of the digital content based on one or more of the plurality of predefined parameters.

The at least one of the credits, tokens, and the redeemable points are redeemable for a digital certification for professionals. The at least one of the credits, tokens, and the redeemable points are redeemable for a monetary transactional value, and wherein the monetary transactional value comprises a cryptocurrency. The at least one of the credits, tokens, and the redeemable points are redeemable for a monetary transactional value. The processing circuit further comprises a computer-installable agent for watching the progress of the user through the digital content. The computer-installable agent comprises a browser-plug in. The system comprises a front-end context monitoring appliance that generates a plurality of context inputs about the user and the user device during the delivery of the digital content to the user device.

The system comprising an AI/ML (artificial intelligence/machine learning) system remotely connected to the front-end context monitoring appliance and communicatively coupled to the context sensing engine, wherein the AI/ML system: receives a signal containing context inputs from the user device and an output generated based on the context inputs; processes the context inputs to determine a contextual pattern associated with the consumption of the digital content utilizing a plurality of intelligent and machine learning-based tools; and transmits a digital signal containing information pertinent to the contextual pattern to the processing circuit.

The micro content blocks are time-stamped before transmission by a micro-content communication component to the user device associated with the user. The system comprising a blockchain device that interacts with the user device through a plurality of blockchain configured distributed access points over a blockchain network. The blockchain device comprises a distributed trusted ledgers system containing a plurality of distributed blockchain ledgers associated with a plurality of computing terminals such that each ledger stores a copy of a computer-executable file containing the context inputs, the micro content blocks, and computer-executable evidence about the consumption of the digital content in association with and based on a respective genuineness score. The blockchain device comprises a blockchain database to store the collected context inputs, the micro content blocks, and computer-executable evidence about the consumption of the digital content in association with and based on the respective genuineness score.

Another embodiment provides a blockchain-enabled information management server for live digital streaming of digital content including one or more content blocks for a user device, the information management server comprising a memory circuit maintained on one or more non-transitory computer-readable media; a processing circuit that creates a reward based on monitoring a user by: identifying a progress of the user through the digital content presented on a display device associated with the user device, wherein the digital content comprises a collection of micro content blocks, the progress of the user being at least dependent on one or more of a plurality of predefined parameters; identifying a computer-executable progress score of the user based on the progress identified for the user; defining a computer-executable reward value for the user based on the computer-executable progress score and the computer-executable genuineness score associated with the user upon successful achieving at least a defined level of the progress; and instructing the user to redeem the computer-executable reward value as an equivalent transactional amount upon submission of the progress based on the computer-executable progress score and the computer-executable genuineness core. A validation appliance assesses a computer-executable genuineness score associated with consumption of the digital content by the user; and a precision blocks creator generates the one or more micro content blocks from a plurality of information blocks extracted from a database or from a plurality of distributed information sources. The information management server comprising a blockchain device that interacts with the validation appliance through a plurality of blockchain configured distributed access points over a blockchain network such that the validation appliance facilitates generating and storing, in a blockchain database, an evidence of the consumption of the micro content blocks in association with the computer-executable genuineness score by the user device.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a front-end context monitoring appliance connected with a context sensing engine in accordance with an embodiment herein;

FIG. 4 illustrates a validation appliance connected in accordance with an embodiment herein;

FIG. 6 is a block diagram illustrating a computer system used in accordance with the embodiments herein.

DETAILED DESCRIPTION

Figure 1:
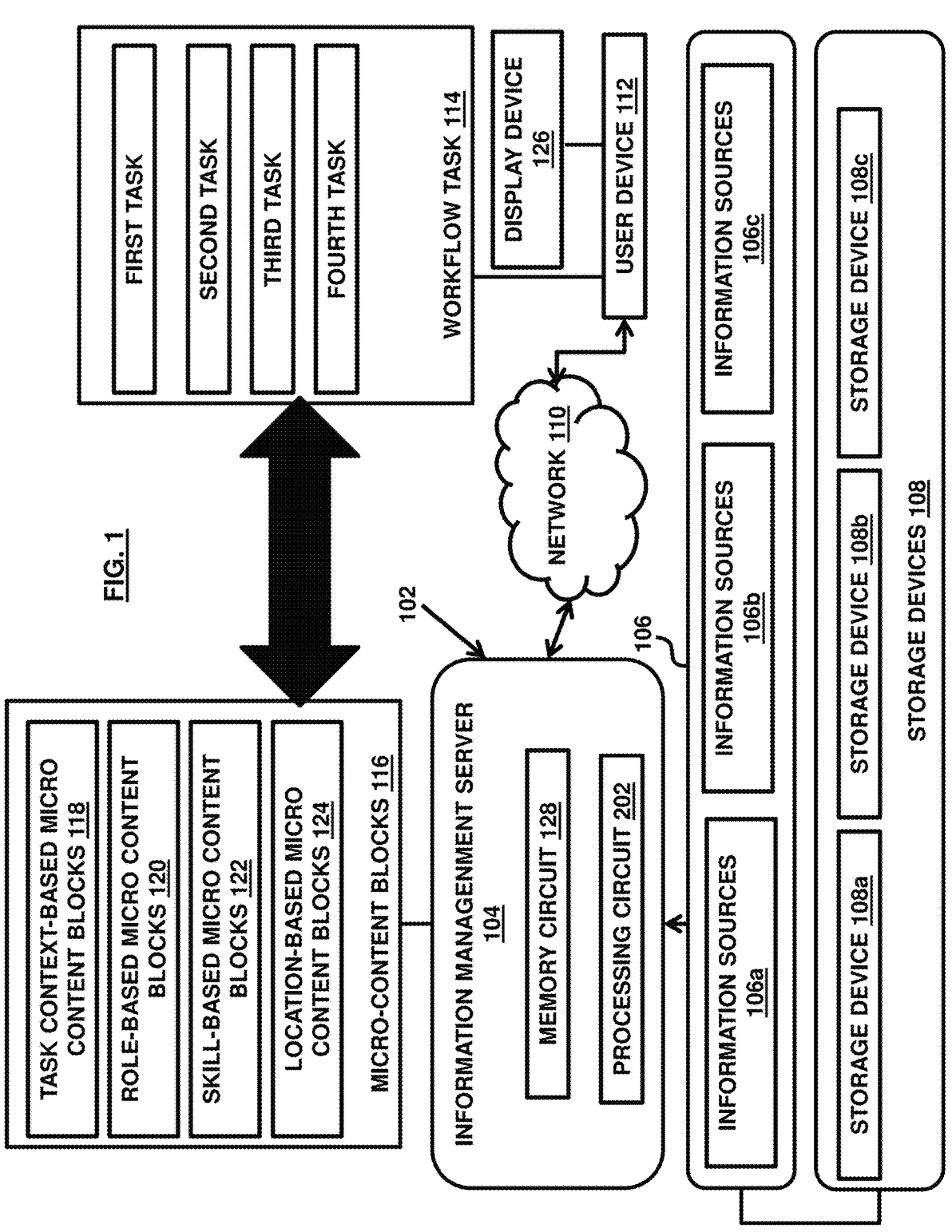
FIG. 1 illustrates an example of a computer architecture in which various embodiments herein may operate.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 6, where similar reference characters denote corresponding features consistently throughout the figures, there are shown exemplary embodiments. In the drawings, the size and relative sizes of components, layers, and regions, etc. may be exaggerated for clarity.

FIG. 1 illustrates an example of a computer architecture in which various embodiments herein may operate. The computer architecture may include a system 102 for digital streaming of one or more precision blocks in real-time for a user need. The system 102 may include an information management server 104 configured for navigating through a plurality of information sources 106a, 106b, and 106c (collectively referred to as information sources 106) distributed remotely from one another and storing digital files executable by a computer (such as the information management server 104) in a plurality of respective storage devices such as a storage device 108a, a storage device 108b, and a storage device 108c collectively referred to as storage devices 108. An information source of the information sources 106 may store its respective digital files in one or more storage devices 108 that are associated with the respective information source. The information sources 106 and the storage devices 108 shown in FIG. 1 are for illustration purposes only, otherwise the number of information sources 106 and the number of storage systems 108 may be different. In some embodiments, there may be any number of information sources 106 and storage systems 108.

The information management server 104 may be connected to user devices associated with a plurality of users. As an example, for the purpose of describing an embodiment, the information management server 104 is shown to be communicatively connected with one user device 112 through a communication network 110, such as the Internet or an Intranet. The user may request a specific module for digital delivery in an embodiment. In another embodiment, the information management server may deliver the micro-content blocks automatically based certain contextual parameters such as user preferences, modules or communities or courses joined or subscribed by a user, and the like. The user device 112 is associated with the user and is also located remote from the information management server 104.

In an embodiment, the user may prefer to perform a workflow task 114 that may involve a series of tasks called micro-tasks such as a first task, a second task, a third task, and a fourth task, etc. without limitations in number. Each of these micro-tasks may be performed in a particular sequence at particular locations and particular time slots by the user. These micro-tasks may be independent of one another, or totally or partially dependent on at least some of the other micro-tasks. In an embodiment, the delivery of precision blocks may be planned and scheduled according to the workflow task 114 and the respective micro tasks so that the user may receive the precision blocks to suffice precision education needs to perform certain actions requiring knowledge top-up.

In an embodiment, the information management server 104 may be configured to monitor and receive details pertinent to the workflow task 114 and or other user context-based on certain inputs received from the user device 112 and/or based on certain automated transfer of digital messages from the user device 112 and its associated sensors and monitoring agents such as a front-end context monitoring appliance 310 as shown in FIG. 3 and described later. The information management server 104 may serve the user device 112 one or more precision blocks 116 based on the inputs received and/or the digital messages, which may be indicative of the workflow task 114 along with associated respective micro-tasks and the context of the user device 112, user, and the performance of the workflow task 114 (referred to as contextual patterns).

The precision blocks 116 may be of a variety of types based on the types of contextual patterns associated with the user device 112 and the workflow task 114 and/or based on what is requested by the user for information consumption. In an example, the various precision blocks 116 may include information elements generated by mapping onto each micro-task for relevancy, role of the user interacting for executing a specific micro-task, level of experience or skill sets of the user for a particular micro-task. Therefore, the various precision blocks 116 provides a set of structured digital information blocks that are relevant and related and deeply maps onto various micro-tasks when looked in association with the skillsets of the user, location of the user, nature of micro-tasks and the overall workflow task 114, role of the user in various micro-tasks, and the like. In an embodiment, the precision bocks delivery is controlled by an organizer of a specific educational module or activity. For example, if the user wishes to join a digitally managed educational course, the user receives predefined precision blocks or content blocks or micro content blocks used interchangeably at a predefined delivery schedule for consumption.

The illustrated information sources 106 may include online web sources and databases connected over the Internet, an electronic medical record (EHR), a medical information exchange (HIE), an image archiving communication system storing images, other localized but accessible data stores and the like without limitations. The information sources 106 provide various types of digital information including medical information to the information management server 104. For example, EHRs and web pages can each provide information such as medical information, diagnostic information, radiographs, and the like.

The information management server 104 may be configured to monitor consumption of digital content by the user. The information management server 104 may include or be coupled to a display device 126, a memory circuit 128, and a processing circuit 202.

The memory circuit 128 may be maintained on one or more non-transitory computer-readable media. The processing circuit 202 may be configured to identify progress of the user through the digital content delivered in the form of one or more precision blocks and presented on the display device 126 associated with the user device 112, wherein the digital content comprises a collection of the precision blocks. The progress of the user is at least dependent on one or more of a plurality of predefined parameters. The plurality of predefined parameters may include number of words read by the user, number of characters read by the user, amount of time spent by the user in front of the precision blocks indicative of how seriously and for how much time the user consumes the content. The processing circuit 202 is configured to identify a computer-executable progress score of the user based on the progress of the user.

The processing circuit 202 may comprise any of an integrated circuit, an application-specific integrated circuit (ASIC), field-programmable gate array (FPGA), a microcontroller, a microprocessor, an ASIC processor, a digital signal processor, a networking processor, a multi-core processor, or other suitable processors selected to be communicatively linked to the sensor. In some examples, the processing circuit 202 may comprise a CPU of the information management server 104 or other device. In other examples the processing circuit 202 may be a discrete component independent of other processing components in the information management server 104 or other device. In other examples, the processing circuit 202 may be a microcontroller, hardware engine, hardware pipeline, and/or other hardware-enabled device suitable for receiving, processing, operating, and performing various functions required by the information management server 104 or other device. The processing circuit 202 may be provided in the information management server 104 or other device coupled to the information management server 104, or communicatively linked to the information management server 104 from a remote networked location, according to various examples.

The processing techniques performed by the processing circuit 202 may be implemented as one or more software modules in a set of logic instructions stored in a machine or computer-readable storage medium such as random-access memory (RAM), read only memory (ROM), programmable ROM (PROM), firmware, flash memory, etc. in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out processing operations performed by the processing circuit 202 may be written in any combination of one or more programming languages.

The processing circuit 202 may include a central processing unit, microprocessors, hardware engines, and/or other hardware devices suitable for retrieval and execution of instructions stored in a machine-readable storage medium such that the processing circuit 202 may fetch, decode, and execute computer-executable instructions to enable execution of locally-hosted or remotely-hosted applications for controlling action of the information management server 104 or other device. The remotely-hosted applications may be accessible on one or more remotely-located devices (not shown). For example, the remotely-located devices may be a computer, tablet, smartphone, or remote server. As an alternative or in addition to retrieving and executing instructions, processing circuit 202 may include one or more electronic circuits including a number of electronic components for performing the functionality of one or more of the computer-executable instructions.

In an embodiment, the information management server 104 enables a reward management system for the user to allow earning rewards by the user in various forms upon successful completion of a content module comprising one or more precision blocks. The processing circuit 202 is configured to define a computer-executable reward value for the user based on the progress score of the user upon successful achieving at least a defined level of the progress in information consumption. Consequently, the processing circuit 202 may instructing the user to redeem the computer-executable reward value as an equivalent transactional amount upon submission of the progress to the information management server 104.

Figure 2:
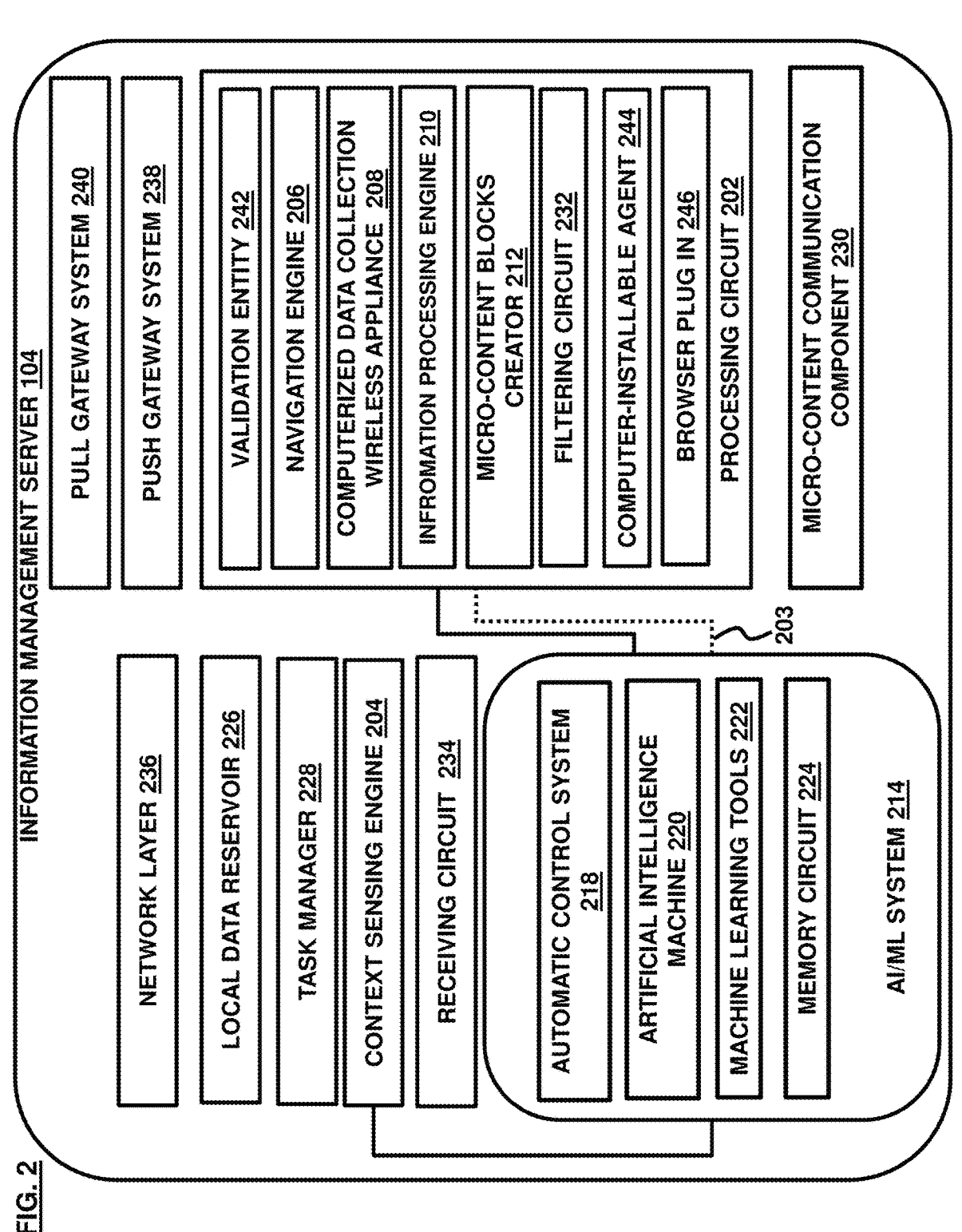
FIG. 2 illustrates a schematic diagram of an information management server in accordance with an embodiment herein.

FIG. 2, with reference to FIG. 1, illustrates a schematic diagram of the information management server 104 in an embodiment. The information management server 104 may include the processing circuit also referred to as a processing circuit 202 interchangeably and a context sensing engine 204. The processing circuit 202 may include a navigation engine 206, a computerized data collection wireless appliance 208, an information processing engine 210, and a precision blocks generator 212. The processing circuit 202 is configured to perform a variety of specialized and general processing tasks including such as navigating for relevant information, extracting the relevant information from the plurality of distributed sources 106, and creating information elements called micro-information blocks or the precision blocks as will be discussed later for delivery to the user device 112. The processing circuit 202 may be capable of executing pre-programmed instructions for performing specialized tasks associated with operation of the information management server 104. The various components of the processing circuit 202 are discussed hereafter in the document.

The processing circuit 202 receives a portion of the digital information that the information management server 104 identifies as relevant and performs specific tasks for processing such as but not limited to indexing, semantic meta tagging, matching, relevancy checking, curating, summarizing, indexing, organizing, processing, standardizing, transforming into precision blocks etc.

The navigation engine 206 is configured to navigate through one or more of the digital information sources 106 accessible over the network 110 and search for the digital information that matches one or more requirements o of the user or as specifically requested by the user. The navigation engine 206 may crawl through millions of web pages and other localized repositories for searching relevant information. The one or more parameters of relevance may be defined based on the nature and context of the workflow task 114, specific micro-tasks associated with the workflow task 114, location of execution or performance of the workflow task 114, actor performing the workflow task 114, context of the workflow task 114, skill-sets of the person performing the workflow task 114, role of the person performing the workflow task 114, the specific types of content requested by the user, the specific course or module the user requests to join, and the like, each indicated through a respective digital input. These parameters may together be indicative of a contextual pattern for the information blocks delivery or precision blocks delivery. In an embodiment, the navigation engine 206 may be configured to search in a predefined database hosted by such as an e-learning organization for online training programs and continuing education as requested by the user based on specific available options.

An AI/ML (artificial intelligence/machine learning) system 214 may utilize the various parameters of relevance associated with the user and create a unified score for determining the contextual pattern associated with the user. The AI/ML system 214 is communicatively coupled to the context sensing engine 204 and the processing circuit 202.

The contextual pattern may be determined based on one or more context inputs received and processed by the context sensing engine 204 as monitored by the front-end context monitoring appliance 310 (shown in FIG. 3). The context sensing engine 204 may be configured to process the one or more context inputs associated with the user (including associated systems) and generate an output signal based on the one or more context inputs. The context sensing engine 204 may include or be coupled to a receiving circuit 234 to receive the one or more context inputs including any manually provided user inputs indicative of the user behaviour etc. The context sensing engine 204 may utilize the context inputs obtained from signals received from the front-end context monitoring appliance 310 (of FIG. 3) indicative of the context of the user indicative of reading/information needs of the user.

In an embodiment, the context inputs may include information about what else the user is reading/browsing/apps they are running. This "extended context" may allow the information management server 104 or associated trainer or teacher to see what else the user is reading and combine that with primary lessons that will act as indicia for whether the primary lesson is being learned. For this purpose, the context sensing engine 204 may include devices (such as browser extensions etc without limitations) which may watch or track what else the user is reading or browsing or apps they are running. In an example, through browser extensions and other types of sensors, the information management server 104 may learn what one might wish to read or watch based on the context and take the user to certain sites or deliver certain information blocks that he would not even have requested so as to add to their learning goals.

In an example, the information management server 104 or any other participant connected to the information management server 104 may set "learning expectations" (such as learning or training Objectives and Key Results (OKRs)) in a structured, defined, manner. This allows an organizer of the education or training program to set and evaluate the expectations. For example, the expectations may be determined by group A (e.g. the federal government) and the trainer may setup lessons tied to the expectations or OKRs and those OKRs may be tracked by the information management server 104 through various devices as discussed elsewhere tied to lessons and the contextual devices discussed in the document may tell whether any measurable goals were being achieved or whether the OKRs or expectations are achieved. In an example, the OKRS or other forms of expectations and measurable results may be defined in a computer-executable format by the information management server 104. This may allow employers or organizers to know whether expected goals, which are about work being performed, are being achieved through various learning exercises—which again may be considered as an input to the genuineness score as discussed in the document to instruct the users to be rewarded not just based on what they participated in but also based on what expectations are met by them.

The processing circuit 202 may include a validation appliance 242 (shown in FIG. 2) that is configured to assess a computer-executable genuineness score associated with review or consumption or reading of the digital content by the user. For example, the computer-executable genuineness score may indicate whether the content is genuinely and seriously consumed or read by the user or if the reading is entirely/partially distracted or misled. The validation appliance 242 generates the computer-executable genuineness score based on a number of predefined evaluation factors such as gaze tracking, micro facial expression tracking, etc. without limitations. The validation appliance 242 is further discussed in conjunction with FIG. 4.

As illustrated in FIG. 3, with reference to FIGS. 1 and 2, the front-end context monitoring appliance 310 may include a context sensor 302 to detect a context of the user, and a GPS device 304 to detect geographical coordinates of a user device 306 associated with the user.

The Global Positioning Service (GPS) device 304 of the front-end context monitoring appliance 310 may help in real-time tracking of location coordinates associated with the user or various event occurrences or performance of the workflow task 114 or respective micro-tasks by collecting their location details. Real-time tracking may offer different challenges in the tracking of the user device 112 and/or the event occurrences or tasks depending on the complexity of the event occurrences when it is performed manually and takes time, resources and manpower. Location data may be collected in most cases by the GPS device 304 using, for example, a radio-navigation system; though in some other specific cases different location technologies can be used.

The front-end context monitoring appliance 310 may include an agent device 312 that may be coupled communicatively and remotely with the information management server 104. Similar agent devices may be coupled with or deployed at other devices too that may be connected with the information management server 104. The agent device 312 may be operated by deploying an installable agent 314 at the user device 306. In an example, the installable agent 314 may be defined in the form of a browser plugin installed by a user on the user device 306.

The processing circuit 202 and the context sensing engine 204 are communicatively connected with the AI/ML system 214 in an embodiment. In an embodiment, the AI/ML system 214 may be an integral part of the processing circuit 202 or the context sensing engine 204. In accordance with an embodiment, the AI/ML system 214 may receive a signal from the context sensing engine 204 containing the processed context inputs. The AI/ML system 214 may process the context inputs to determine a contextual pattern for the user utilizing a plurality of intelligent and machine learning-based tools. The AI/ML system 214 may include an automatic control system 218, an artificial intelligence machine 220, and machine learning tools 222. These components are discussed hereafter in the document.

In an example, the AI/ML system 214 may allow decision-making and determining the contextual pattern based on real-time evidence as generated by the context sensing engine 204 utilizing and processing the context inputs received from the front-end context monitoring appliance 310. The real-time evidence may be generated based on the context inputs monitored by the context sensor 302, GPS device 304, and other devices. The context inputs allow the AI/ML system 214 to perform complex decision-making tasks to determine the contextual pattern associated with the user. The AI/ML system 214 may perform simple and tactical tasks smartly in the absence of humans with the use of the artificial intelligence machine 220 and the machine learning tools 222 because the computer-executable context inputs are trustworthy and are obtained through direct environments associated with the user, user device 306, and the workflow task scenario. The AI/ML system 214 may generate the contextual pattern using certain predefined computer-executable rules that may be defined either by human manually or generated by the network 110 and/or based on learning by the AI/ML system 214 based on past transactions and operations over time. The contextual pattern may be indicative of the actual situation of the user and how he may behave during the information consumption. Accordingly, appropriate steps may be taken by the processing circuit 202 for ensuring necessary support is provided to the user or the user device 306 at the right time.

In an example, the AI/ML system 214 may perform an automated analysis of the context inputs to determine the contextual pattern. The AI/ML system 214 may generate AI/ML-based predictions of future expected behavior and learning requirements by the user using the artificial intelligence machine 220 and the machine learning tools 222 to timely guide at appropriate time in advance when certain information is required by the user. The artificial intelligence machine 220 is configured to generate an output (such as the contextual pattern) smartly using a set of inputs such as the context inputs so that the generated output address requirements of the user for consuming the information in a real-time scenario. In the process, the artificial intelligence machine 220 utilizes the machine learning tools 222. The machine learning tools 222 are configured to train the artificial intelligence machine 220 how to learn over time with more repeat requests for the precision blocks by different users in different contexts. The machine learning tools 222 are given access to data and allowed to learn on its own based on historical records and processing etc.

In an example, the AI/ML system 214 may carry out a predetermined inference on the basis of the aggregated context inputs, and take action in accordance with certain inference results generated as a result of the analysis by the AI/ML system 214. The automatic control system 218 may be provided and adapted for a target action to be taken by the artificial intelligence machine 220 of the AI/ML system 214 on the basis of the aggregated context inputs and the inference results and generate a control output for taking a target action such as generating the precision blocks 116 as will be discussed later. In an example, the AI/ML system 214 may be adapted to drive the artificial intelligence machine 220 on the basis of the inference results and the control output for past events stored in a memory circuit 224.

The AI/ML system 214 may generate the contextual pattern and transmit a digital signal 203 containing information pertinent to the contextual pattern to the processing circuit 202. The processing circuit 202 may perform a set of processing tasks as described herein.

In an implementation, the AI/ML 214 (artificial intelligence/machine learning) system remotely connected to the front-end context monitoring appliance 310 and communicatively coupled to the context sensing engine 204. The AI/ML system may receive a signal containing the context inputs from the user device and an output generated based on these context inputs.

In an example, the micro content blocks may be time-stamped before transmission by the micro-content communication component 230 to the user device 112 associated with the user.

As discussed above, the pages and other data repositories are crawled by the navigation engine 206 to identify the relevant information in view of the user requirement based on the one or more parameters of relevance. The processing circuit 202 includes the computerized data collection wireless appliance 208 that is configured to extract computer-executable information files from the one or more digital information sources 106 that matches the one or more parameters of relevance for the user as identified and crawled by the navigation engine 206.

The computerized data collection wireless appliance 208 may perform certain data collection tasks digitally to extract computer-executable information files from the one or more digital information sources 106 that matches the one or more parameters of relevance. In the example described herein, the computerized data collection wireless appliance 208 may be permitted to generate and/or collect data from the information sources 106 that are connected to the network 110 and permitted to be accessed by the processing circuit 202 or associated entity such as an organization. The network 110 may be a wireless or a physical network configured to operate as a peer network in some embodiments or a global internetwork.

The data collection wireless appliance 208 or the processing circuit 202 may be coupled communicatively with a local data reservoir 226 such that data collection wireless appliance 208 may be configured to collect, store, and digitally manage data in the local data reservoir 226 that is extracted or collected from the information sources 106 in context of the user.

The information processing engine 210 that is communicatively coupled to the computerized data collection wireless appliance 208 is configured to digitally process the collected computer-executable information files into a plurality of processed information blocks. The process of transformation of the collected computer-executable information files into the processed information blocks may involve a series of steps such as including, without limitations, meta tagging of the information files, summarizing the information files, curation, high level relevancy analysis for the user, through an automated process with or without utilizing one or more operations by the AI/ML system 214, and the like.

The precision blocks creator 212 of the processing circuit 202 is configured to generate the one or more contextual precision blocks 116 from the plurality of processed information blocks based on the output generated by the context sensing engine 204 and/or the AI/ML system 214 indicative of the one or more contextual patterns derived from the context inputs associated with the user and the associated user device 306. The processing circuit 202 may further include a filtering circuit 232 configured to filter the plurality of processed information blocks based on the one or more contextual patterns and the processed content inputs associated with the user as indicative through the output generated by the context sensing engine 204 and/or the AI/ML system 214 communicatively coupled to the processing circuit 202. This may allow more accurate and relevant information to be used for generating the precision blocks 116.

The filtering circuit 232 removes redundant or unwanted information from an information stream (such as the processed information blocks) using automated or computerized methods prior to presentation to the user in the form of the precision blocks. The filtering circuit 232 manages the information overload and increment of the semantic signal-to-noise ratio. The filtering circuit 232 compares the processed information blocks with certain reference characteristics such as the contextual pattern to determine what is noise vs what is important for a particular workflow task or a series of micro tasks.

The one or more precision blocks 116 may include context-based precision blocks that are generated in view of the user requirements. The user requirements in an embodiment may include the nature of the workflow task 114 and the situation in which the workflow task 114 is being executed and the various micro-tasks associated with the workflow task 114 and the nature of each micro-task thereof. The one or more precision blocks 116 may include a location-based precision block 124 that is generated in view of the location of actual execution of the workflow task 114. The one or more precision blocks 116 may include a role-based precision block 120 that is generated in view of the role of the user in performance of the workflow task 114.

The one or more precision blocks may include a skills-based precision block 122 that is generated in view of the skillsets of the user. The one or more precision blocks 116 may include a task context-based precision block 118. The task context-based precision block 118 may be based on inputs received and/or digital messages, which may be indicative of the context of the task associated with the user. The context sensing engine 204 may utilize these context inputs obtained from signals received from the front-end context monitoring appliance 310 indicative of the context in which the task is being performed, which helps in generating recommendations for the task context-based precision block 118. Many additional types of precision blocks 116 or alternatively referred to as micro content blocks may be generated without limitations.

In an example, the various precision blocks 116 may include information elements extracted from the processed information blocks by mapping onto the user requirement or demand for the content. Therefore, the various precision blocks 116 provide a set of structured digital information blocks that are relevant to the user or pertain to the demand of the user specifically.

In an embodiment, each micro step or micro-task may be of a few seconds or minutes duration or may be longer. The duration of a micro-task may depend on the level of guidance it needs as a standalone step independent of other steps or micro-tasks. The workflow task 114 may be broken into the micro-tasks based on the level of guidance a portion of the entire workflow task 114 may require for the user to effectively execute it. For example, a task may involve a series of five steps such that the first step involves understanding a particular function in order to start a medical device, while the remaining four steps are merely to monitor the different values generated by the device. In an example, the task may be broken into two micro-tasks: a first micro-task involving the first step, and a second micro-task involving the remaining four steps. In an embodiment, each step may be defined by a separate micro-task or more than one micro-task. The procedure of determining the various micro-tasks based on the workflow task 114 is performed by a task manager 228.

The task manager 228 may be configured to manage various tasks such as delivery of the micro content blocks in accordance with schedule of the workflow task 114. The task manager 228 is communicatively coupled to the processing circuit 202. The task manager 228 may schedule the delivery of the precision blocks 116 according to schedule of the tasks and the associated micro-tasks and accordingly tie different tasks on a time series and identifies timelines associated with the delivery of the precision blocks 116 for the different tasks.

The task manager 228 examines the status of the micro-tasks on the time series and generates an automated output indicative of the task's status and respective precision blocks delivery. The task manager 228 may automatically notify to the user about status of the precision blocks delivery for the tasks as soon as they are delivered and/or their tasks are complete or if the delivery is pending after due time. The task manager 228 may, in general, organize scheduling of the tasks as they are to occur and accordingly connect with other systems and components for allowing the delivery of the precision blocks 116 without any delay and/or conflict.

In an embodiment, the task manager 228 may serve as a command center and can track activities of the users such as who is reading, who is learning, and who is spending what time on what content as indicated through tracking of the time spent by the users on the different precision blocks 116 delivered to them. Accordingly, intelligent recommendations may be sent to the users based on their education habits and those items that are more useful to their activities and tasks.

The precision blocks 116 are related precisely to specific micro-tasks associated with the workflow task 114 or pertain to what is actually demanded by the user of content independent of a pre-decided task and are communicated by the processing circuit 202 to the user device 306. The micro-content communication component 230 of the processing circuit 202 transmits the one or more contextual precision blocks to the user device 306 associated with the user at a time when the user needs or requests for them. The one or more contextual precision blocks 116 may be time-stamped before transmission to the user device 306 associated with the user for real-time delivery according to the needs at particular times.

In various examples, the information sources 106 may be hosted by applications such as websites or electronic applications or mobile applications or computing machines associated with third-party companies or third-party vendors (or merely third parties for simplicity of description). The information blocks obtained from the information sources 106 may be transformed into the precision blocks 116 based on context data analysis, application data analysis, user data analysis, AI/ML by the information management server 104 so as to generate necessary information presentable on a user screen in the form of the precision blocks 116 by the information management server 104.

The recorded or monitored context sensitive, application sensitive, or user sensitive information (together referred to as contextual data or information or context sensitive data or information or contextually sensitive data or information) by the front-end context monitoring appliance 310 may be supplied to the information management server 104 for further processing of the information and generating and delivering the precision blocks 116 to the user device 306 as discussed above. The contextual data monitored by the front-end context monitoring appliance 310 may change with time and may also be different for different tasks.

In some embodiments, the computerized data collection wireless appliance 208 may be configured to perform certain data collection tasks within the network 110 digitally. In an example, the computerized data collection wireless appliance 208 may be permitted to generate and/or collect data from various devices such as medical devices, web pages, local data repositories, etc. together referred to as the information sources 106 that operate within the network 110. The computerized data collection wireless appliance 208 may be configured to collect, store, and digitally manage data at the information management server level that is extracted or collected from the information sources 106.

The network 110 may broadly represent one or more LANs, WANs, cellular networks (e.g., LTE, HSPA, 3G, and other cellular technologies, etc.), global internet, and/or networks using any of wired, wireless, terrestrial microwave, or satellite links, and may include the public Internet.

In FIG. 2, a network layer 236 may be provided that may use a push gateway system 238 and/or a pull gateway system 240 to collect the data from the information sources 106. In the pull gateway system 240, the network layer 236 may be permitted to send or ask queries to the information sources 106. In response to the queries, a computer-executable file containing information may be pulled in by the network layer 236 from the information sources 106. In the push gateway system 238, the network layer 236 may monitor various data elements at the information sources 106 and the information sources 106 may push relevant data in the form of the computer-executable files into the network layer 236 to get transferred to a central database or a local data reservoir 226.

The data collected from the information sources 106 may be stored in the local data reservoir 226 either for a small period of time just before it gets processed by the processing circuit 202 or for a longer time such as a retention period as necessary.

The devices or machines that may generate the digital data extracted by the computerized data collection wireless appliance 208 or its components (exporters) thereof may include such as medical devices, FHIR-capable systems (EHRs), HL7-capable systems (EHRs or electronic health record systems), Non-HL7/FHIR EHRs, etc., source databases, safety/error reporting systems, global web pages, social media posts, local data repositories and the like.

FIG. 4 illustrates the validation appliance 242 in an embodiment. The processing circuit 202 may include the validation appliance 242. The validation appliance 242 may be configured to assess the computer-executable genuineness score associated with review or consumption or reading of the digital content by the user. For example, the computer-executable genuineness score may indicate whether the content is genuinely and seriously consumed or read by the user or if the reading is entirely/partially distracted or misled. The validation appliance 242 generates the computer-executable genuineness score based on the predefined evaluation factors such as gaze tracking, micro facial expression tracking, etc. without limitations.

The validation appliance 242 may include a gaze tracking device 402 for continued tracking of gaze of the user through the digital content or the delivered micro content blocks. In an embodiment, the user may use the user device 112 to consume content o the content blocks in a non-linear manner. The user device 112 may display a consumption representation in connection with the consumed content. The consumption representation may represent locations of portions of the content that have been consumed. In addition, the gaze tracking device 402 may track the consumption of the content using various techniques for determining whether a particular portion of content is likely to have been consumed or is skipped or is ignored. In some examples, the consumption representation may be displayed with an indicator to indicate the presence of embedded content that may be provided with certain content items. The indicator of embedded content may further indicate information such as a location, a content type, and/or a consumption status of the embedded content based on an output generated by the gaze tracking device 402 that tracks pattern of the gaze using an eye movement sensor 406 included within the gaze tracking device 402. In an embodiment, the consumption representation may be displayed with the indicator on the user device 112. In an embodiment, the consumption representation may not be displayed on the user device 112 at the time of user consuming the content but may be stored in the backend by the validation appliance 242 and may be provided to the user as an evidence after a reading session is over so that the user can know how much productive was his/her content consumption exercise so there is no conflict later about redeeming the rewards or generating the reward values due to pre-stored evidence.

In some implementations, one or more voice commands may be used to control or interact with the content blocks or interfaces herein. Further, in some examples, a user's eye position, gaze, or point of focus may be detected to serve as inputs or commands by the gaze tracking device 402 of the validation appliance 242. Thus, implementations herein are not limited to any type of input devices, techniques, or controls.

The gaze tracking device 402 may be used for determining whether the user has completed reading a page genuinely or is skipping or ignoring some or all portions of the delivered content blocks. For instance, the user device 112 may include one or more cameras 408 or other sensors that may be coupled communicatively and/or operatively with the gaze tracking device 402 for tracking the gaze of the user to determine whether the user has read a particular page. Gaze tracking may determine when the user starts reading text at a beginning of the page, and may determine that the user has traversed the text on the page to the end of the page. Similarly, for video content, the gaze tracking may determine whether the user is actually looking at the video while the video content is being displayed. Gaze tracking may also monitor actuations that may include such as eye movement, gaze target detection, eye blinking, eye closure or opening, lip movement, head movement, and staring, to mention a few examples. The camera 408 may be coupled to the gaze tracking device 402 and aimed at the user's face. The camera 408 may be associated with a gaze tracking software 412 that responds to detected eye and gaze inputs, such as eye expression or head movements.

The validation appliance 242 may include a micro facial expression tracking device 404 for continued monitoring of micro facial expressions of the user through the progress of the digital content or the delivered micro content blocks. Facial actuations may be used to detect user inputs to control the display of text and track/evaluate the consumption of the content by the user. For example, in connection with an electronic book reader, facial actuations can be interpreted to indicate consumption of the content.

The camera 408 may be coupled to the micro facial expression tracking device 404 and aimed at the user's face. The camera 408 may be associated with a micro facial tracking software 410 that responds to detected facial actuations and micro expressions, such as facial expression or movements in micro levels.

The computer-executable genuineness score is indicative of an extent of attention paid by the user while going through the digital content or reviewing/reading the delivered content blocks such that a higher computer-executable genuineness score is indicative of a higher reward value for the user. The higher is the genuineness score the higher is the chance that the user is paying attention to the content and accordingly the more are the rewards and redeemable points or credits for the user. In an embodiment. The processing circuit may determine the reward value for the user during the consumption of the delivered and read or viewed content blocks based on the genuineness score. The processing circuit 202 may be configured to define at least one of credits, tokens, and redeemable points for each type of the digital content based on one or more of the plurality of predefined parameters such that the reward value can be generated and provided to the user in different forms of actual dollar amounts or other currency, tokens, education credits, or redeemable points etc. The plurality of predefined parameters are mentioned elsewhere in the document and may include without limitations number of words read by the user, number of characters read by the user, amount of time spent by the user in front of the micro content blocks.

The validation appliance 242 may ensure that the content consumption is genuinely done by the user by utilizing scoring through the genuineness score. As one example, suppose that a user is reading an electronic book (eBook), such as a textbook, reference book, history book, or any other type of book. The user may elect to read only certain pages, chapters, sections, or the like, of the book, while skipping other portions of the book. The validation appliance may keep track of which portions of the book the user has read and which portions the user has skipped over, and may provide a visual depiction of the portions skipped and the portions read in the consumption representation for the book.

The validation appliance 242 may track other types of content in addition to electronic books, such as multimedia content, content items having embedded content, digital documents, webpages or online documents, and the like. In addition to the location of portions of content consumed, other types of information may also be conveyed with the consumption representation for a content item, such as portions of content accessed frequently, locations of embedded content, locations of annotations and highlighting, locations of material flagged by the author content provider, locations of trending or missing material, locations of chapter breaks or sections of the content, as well as locations of various terms of interest in the content such as character names, place names, topics, and so forth. Furthermore, a content provider may synchronize the consumption information of a user across multiple devices of a user to inform the user of the progress made with respect to a particular content item accessed on a plurality of the multiple devices. Additionally, the content provider may aggregate consumption information for a particular content item from multiple users to provide various types of information to the user or other users that may be interested in the particular content item. In an embodiment, the evidence as proof of content consumption may be stored over a blockchain so there is no scope of tampering with the evidence and minimizing the chances of conflicts among participants. The blockchain network and the integration of blockchain is discussed later in the document.

The credits, tokens, and the redeemable points may be redeemed for a monetary transactional value by the user, wherein the monetary transactional value may include a cryptocurrency or a traditional currency such as a dollar value.

In an embodiment, the credits, tokens, and other forms of the redeemable points may be redeemed for a digital certification for professionals such as the user so that the user can be receive a certification for a coursework completed upon consumption of certain defined content blocks necessary for the coursework. This may allow the disclosure herein to find applications in continuing education programs such as continuing medical education and award certifications and CME (continuing medical education) credits etc.

The processing circuit 202 may therefore consider the predefined plurality of parameters, genuineness score, and the delivered content blocks to determine the reward value. The processing circuit 202 allows calculating the reward value for rewarding educational accomplishment or completion of specific coursework or assignments digitally.

In an example, the rewarding for the educational accomplishment may involve a first party providing educational activity or other reading assignments to one or more users such as the user or the user device 112 discussed in the document, who participate in the activity. The first party may be a company that organizes and manages operation of the digital educational program or activity. The first party may be the developer of the educational activity, or it may work with other entities to develop or organize the educational activity. The educational activity may be, for example, the attending of a museum or certain classes at a secondary school, completion and handing in of homework, passing educational tests within the context of a computer game, or other educational achievement-oriented activities or continuing medical education, or other forms of video-based or text-based or audio-based reading and watching or listening sessions.

When the user participates in the educational activity, he or she is provided points for achieving certain goals within the activity based on the genuineness score and other parameters as discussed elsewhere. For example, the user may obtain points by correctly answering certain number of questions on a computerized test provided by the first party through the Internet or may be rewarded for completing an assignment in a digital classroom etc.

The redeemable points and/or the reward value may be provided to the user in various ways as discussed in the document. The reward value may be based on the usual time taken for reading the content, or length of the video seen, or numbers of characters/words read and the like without limitations.

Referring to FIG. 2, the processing circuit 202 (also referred to as processing circuit interchangeably without limitations) may include a computer-installable agent 244 for watching the progress of the user and/or the user device 112 through the digital content. In an embodiment, the computer-installable agent 244 may be integrated within the agent device 312 of the front-end context monitoring appliance 310. In an embodiment, the computer-installable agent 244 may include a browser-plug in 246.

The terms "book" and/or "eBook," or the content blocks as used herein, may broadly include electronic or digital representations of printed works, as well as digital content that may include text, multimedia, hypertext, and/or hypermedia. Examples of the content blocks may include, but are not limited to, electronic books, magazines, newspapers, periodicals, journals, reference materials, textbooks, anthologies, instruction manuals, proceedings of meetings, forms, directories, web pages and online documents, emails, plays, screenplays, closed captioning transcripts of movies and television shows, song lyrics, personal documents, word processing documents, portable document format documents, business and office documents, and so forth, as well as other types of content items including text or multimedia that the user may view or interact with using the user device 112. Accordingly, a content block may include any readable or viewable textual content that is in electronic or digital form, and additionally, or alternatively, multimedia content, such as video content, audio content, image content, and/or interactive content, such as Flash® content, video game content, 3D graphics content, and the like.

A facial activity may be recognized by the validation appliance 242. The activity may be recognized from a video stream supplied from the camera 408 to the validation appliance 242. The micro facial tracking software 410 may help detect and/or process movement of the user's skin etc, movement of the user's facial expressions, or even other movements, in some embodiments. Image recognition techniques may be utilized to recognize the facial expressions, or other movements and to distinguish these various actuations as distinct user inputs indicative of consumption of the content. The validation appliance 242 may include or may be coupled to an image recognition device 414.

The image recognition device 414 may receive signals containing image patterns and facial expressions such as from the cameras 408, gaze tracking device 402, micro facial expression tracking device 404 or other sensors and devices etc. The image recognition device 414 may include or be coupled to the camera 408 for taking still or streaming images. The image recognition device 414 may include a plurality of multichannel amplifiers (MCA) (not shown) such that each amplifier of the multichannel amplifiers may be defined to receive a specific type of sensed information from a particular type of sensor or camera 408 sourcing signals for the image recognition device 414. The amplified signals obtained from the plurality of multichannel amplifiers may then be transmitted to the image recognition device 414 for fragmenting the received image patterns to identify micro level details such as micro facial expressions and the like. These federated image patterns may then be transmitted to the validation appliance 242 for further processing and evaluation of the genuineness score and tracking of the content consumption by the user. The information may be received in the form of a digital signal containing the received image patterns. The image recognition device 414 may be adapted to receive the digital signal and generate/transmit the digital signal to the validation appliance 242 or components thereof for image recognition (including such as micro facial expressions). The validation appliance 242, in association with necessary recognition software, may be adapted to discriminate between multiple image patterns (including gaze and micro facial expressions).

The micro facial expressions and the gaze are placed in their context. For example, the context may be that the user has gazed at one target for a given amount of time. Another context may be that the user has blinked after providing another eye tracking software recognized indication. Thus, the context may be used by the validation appliance 242 to interpret what the user meant by the eye tracker detected actuation. The eye activity and its context are analyzed to associate them with the desired user input. In other words, the context and the eye activity/facial expressions are associated with a command or control the user presumably meant to signal. Then, a genuineness score may be determined based on the detected activity and its associated context regarding any content blocks delivery or content consumption exercise.

In embodiments, the term "facial expression" is not limited to only expressions of the user on his/her face. Instead, the term 'facial expression' may also include without limitations any form of body language or gestures or any other non-verbal communication, in general. Nonverbal communication may include body gestures and indirect input (e.g. nonverbal communication). The nonverbal communication may include cues such as various forms of body language, body movement, posture, breathing rate, heart rate, well as vocal cues (e.g. prosodic and acoustic cues) and the like. Different nonverbal communication cues may be recorded and monitored as user inputs.

Figure 5:
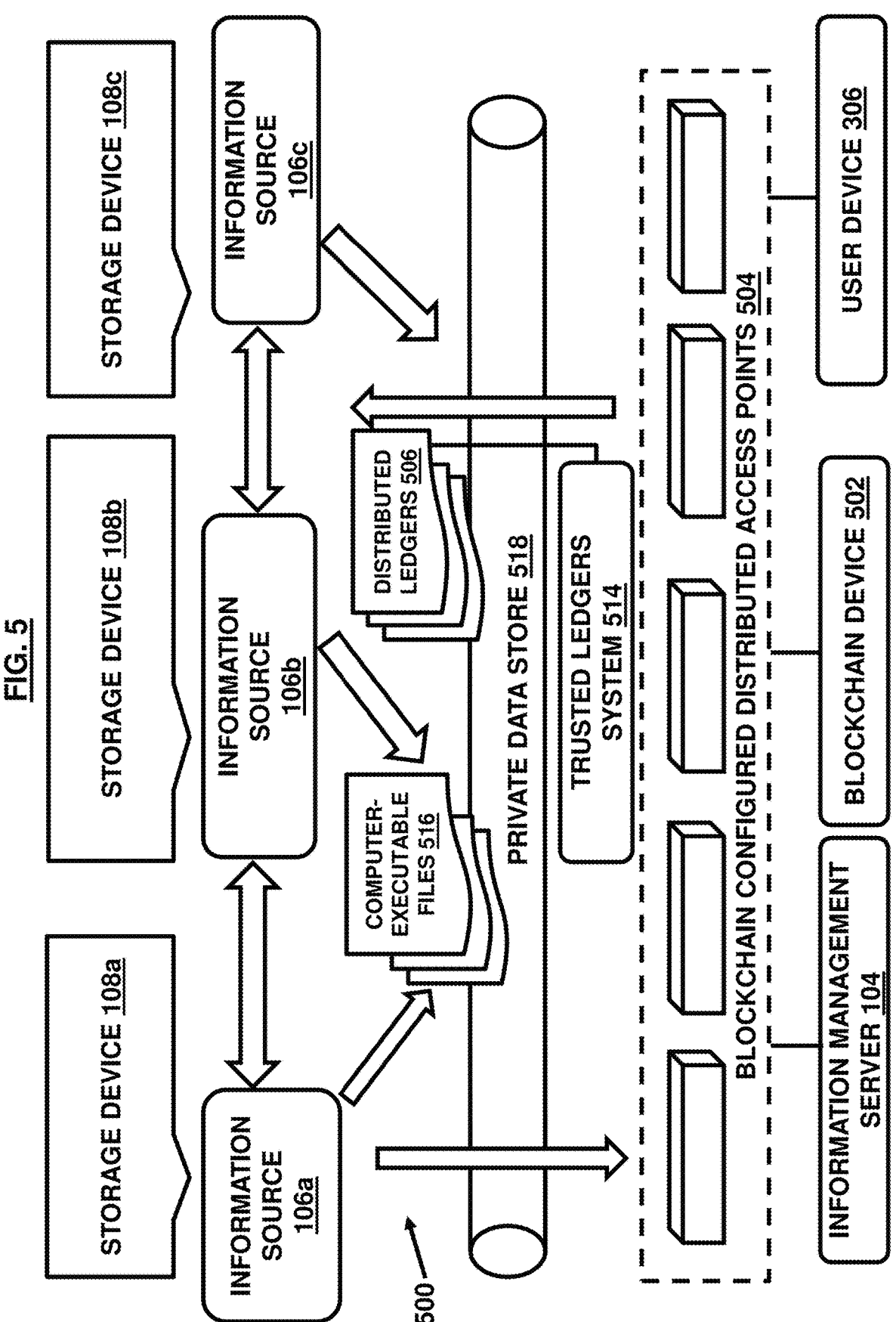
FIG. 5 illustrates a blockchain-configured ecosystem architecture containing one or more components of the system of FIGS. 1-4 in accordance with an embodiment herein.

FIG. 5, with reference to FIGS. 1 through 4, illustrates an exemplary blockchain-configured ecosystem architecture 500 containing one or more components of the system 102 and also contain additional components so as to allow integrity of transactions and the digital data (including the information blocks and the precision blocks) shared/processed during the transfer or storage as discussed above in the document. The blockchain-configured ecosystem architecture 500 may provide a crowdsourced integrity network for storing the data accessed or extracted or transformed for sharing or storing across the network 110 instead of locally stored information by different participants or databases that may be tampered with.

The ecosystem architecture 500 may be blockchain-configured involving various blockchain devices. For example, the information management server 104 may interact with a blockchain device 502 through a plurality of blockchain configured distributed access points 504. A network that facilitates interaction across all components may be a blockchain integrity network. The blockchain network may build trust among the various participants or entities or systems or components thereof and their associated computing terminals or devices even if the devices/terminals or machines etc. may not "know" one another. The blockchain network may allow connections and transactions and recording and sharing of the data, information blocks, precision blocks, and various codes/token generated during an entire transaction including service tokens and authorization tokens in a trusted mode. A record of transactions and sharing and data from various terminals/devices stored on the blockchain in the form of computer-executable distributed ledgers 506 may provide proof to command the necessary trust among the terminals/devices (such as those associated with various participants/nodes etc. without limitations) to cooperate through a peer-to-peer or peer-to-client distributed digital ledger technology system. The ecosystem architecture 400 may include a distributed trusted ledgers system 514 containing the distributed ledgers 506 associated with a plurality of computing terminals and devices such that each ledger stores a copy of computer-executable files 516 containing the context inputs, context patterns, precision blocks, information blocks, information extracted from the information sources 106, and various other details corresponding to the tasks such as the workflow task 114 and the trust notes for defining security and trust among the computing terminals and devices across the network so that each computing terminal trusts the other computing terminal through the blockchain. The distributed ledgers system 514 enables coding of rules-based contracts that execute when specified conditions are met. The distributed ledgers 506 make it easier to create cost-efficient networks where any device or any evidence associated with a task execution or transaction may be tracked, without requiring a central point of control.

The various computing terminals or devices in the network serve as distributed peer-to-peer nodes and connections. The information management server 104 and its components thereof may be configured to perform the task of processing the context inputs and the information blocks further through the blockchain network based on the rules as defined and discussed herein. Each terminal/device/node in the ecosystem architecture 400, etc. may receive a copy of the blockchain which may get downloaded automatically upon joining the blockchain integrity network. Every permissioned node or the device in the network is an administrator of the blockchain, and may join the network voluntarily so that the network is decentralized.

The blockchain may eliminate the risks that come with data being held centrally by storing data across the network which may include the computer-executable files 516 containing the information blocks, context inputs, context patterns, etc. and/or the various tokens/codes including transaction codes. The blockchain security use encryption technology and validation mechanisms for security and integrity verification. The security may be enabled through public and private keys. A public key may define a user's address on the blockchain. The private key may give its owner an access to various digital assets in the network.

In an embodiment, the distributed ledgers 506 may enable coding of smart contracts (with the use of such as smart contract systems) that will execute when specified conditions are met. These smart contracts may protect various information pieces associated with the service deliveries and other transactions and data processing/storage and eliminate the risk of files copying and redistribution without protecting privacy rights.

The blockchain-configured ecosystem architecture 400 may provide a private view for the various devices and the entities operating in the network through the private data store 518 so that each permissioned device such as the information management server 104 may privately access the computer-executable files 516 associated with a task or user inputs and requests for content consumption based on various policies such as based on their respective identities. The information management server 104 may access the computer-executable files 516 through the dedicated private data store 518 available through the plurality of distributed blockchain-configured access points 504, which may be enabled in the form of distributed blocks as shown in FIG. 5, with each block providing the ability to access the features of the blockchain-configured ecosystem architecture 500 by different terminals and devices at the same time based on defined and granted access rights.

The private data store 518 may provide a virtual storage to facilitate interaction, information exchange, reviewing, and presentation of the computer-executable files 516. For example, the private data store 518 may allow a virtual storage and presentation of only limited executable files or portions of the executable files for access by particular entities or participants in accordance with permissions granted for reviewing. The private data store 518 may be configured to auto-hash review interactions at any required interval. This compartmentalization of the computer-executable files 516 ensures that the computer-executable files 516 are secured and private as per access rights authorized to the nodes. The data presented on the private data store 518 of the blockchain serves as a secure way to ensure that the private data store 518 is in sync with any permissioned access.

In an embodiment, the blockchain-configured digital ecosystem architecture 400 may provide a federated blockchain comprising of several entities/participants (including the user) and their associated computers and devices (such as the user device 306) and sensors that jointly interact to process transfers of data through a trusted, secured and distributed network of the blockchain-configured access points 504.

In an embodiment, the blockchain device 502 may include the distributed trusted ledgers system 514 containing the plurality of distributed ledgers 506, which may be blockchain ledgers, associated with the computing terminals such that each ledger stores a copy of a computer-executable file containing the context inputs, the micro content blocks, and computer-executable evidence about the consumption of the digital content in association with and based on a respective genuineness score. The information when stored along with the genuineness score and how the genuineness score is determined using sensed inputs etc provide a proof about the consumption of the digital content in the form of the micro content blocks in case there occurs a conflict or dispute at a later time. A blockchain database may store the collected context inputs, the micro content blocks, and the computer-executable evidence about the consumption of the digital content in association with and based on the respective genuineness score for proof of content consumption tied to genuineness and seriousness during the content consumption.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing at least one digital signals or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such as Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

In an example, the embodiments herein can provide a computer program product configured to include a preconfigured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 6, with reference to FIGS. 1 through 5. This schematic drawing illustrates a hardware configuration of an information handling/computer system 600 in accordance with the embodiments herein. The system 600 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 600 can read the inventive instructions on the program storage devices and follow these instructions to execute the methodology of the embodiments herein. The system 600 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A blockchain-enabled information management server for live digital streaming of digital content including one or more content blocks for a user device, the information management server comprising:

a memory circuit maintained on one or more non-transitory computer-readable media, wherein the memory circuit stores context inputs received from the user device;

an AI/ML (artificial intelligence/machine learning) system that uses a trained machine learning model to determine a contextual pattern associated with consumption of digital content based on the context inputs;

a processing circuit that creates a reward based on monitoring a user by:

transmitting at least one micro content block to the user device based on the contextual pattern;

identifying a progress of the user through the digital content presented on a display device associated with the user device, wherein the digital content comprises a collection of micro content blocks, the progress of the user being at least dependent on one or more of a plurality of predefined parameters comprising a number of words read by the user, a number of characters read by the user, or an amount of time spent by the user consuming the micro content blocks;

identifying a computer-executable progress score of the user based on the progress identified for the user;

defining a computer-executable reward value for the user based on the computer-executable progress score and a computer-executable genuineness score associated with the user upon successful achieving at least a defined level of the progress;

instructing the user to redeem the computer-executable reward value as an equivalent transactional amount upon submission of the progress based on the computer-executable progress score and the computer-executable genuineness score;

a validation appliance that assesses a computer-executable genuineness score associated with consumption of the digital content by the user, wherein the validation appliance comprises:

a gaze tracking device that continuously tracks gaze of the user through the digital content using an eye movement sensor to determine whether a particular portion of the digital content was consumed and to generate gaze information; and a micro facial expression tracking device that continuously monitors micro facial expressions of the user through the progress of the digital content using a micro facial tracking software to detect changes in facial expressions indicative of attention levels and to generate micro facial expression information;

wherein the validation appliance generates computer-executable evidence of consumption of the micro content blocks based on the gaze information and the micro facial expression information in association with the computer-executable genuineness score;

a blockchain device that interacts with the validation appliance through a plurality of blockchain configured distributed access points over a blockchain network, wherein the blockchain device stores the computer-executable evidence generated by the validation appliance in a blockchain database to create an immutable record of the consumption of the micro content blocks; and a precision blocks creator that generates the one or more micro content blocks from a plurality of information blocks extracted from a database or from a plurality of distributed information sources.

2. The information management server of claim 1, wherein the AI/ML system is configured to determine the contextual pattern based on at least one of user preferences, modules subscribed by the user, communities joined by the user, and courses joined by the user.

3. The information management server of claim 1, wherein the processing circuit is configured to perform the live digital streaming of digital content by:

extracting, via a computerized data collection wireless appliance, computer-executable information files from the plurality of distributed information sources that match one or more parameters of relevance for the user;

storing the extracted information files in a local data reservoir;

digitally processing, via an information processing engine, the stored information files into a plurality of processed information blocks;

generating, via the precision blocks creator, the one or more micro content blocks from the plurality of processed information blocks based on a contextual pattern;

time-stamping, via a micro-content communication component, each of the one or more micro content blocks;

transmitting, via the micro-content communication component, the time-stamped micro content blocks to the user device in real-time based on a predefined delivery schedule determined by a task manager; and organizing, via the task manager, processes comprising:

scheduling of micro-tasks associated with a workflow task;

tying different micro-tasks on a time series; and identifying timelines associated with the delivery of the micro content blocks for the different micro-tasks.

4. The information management server of claim 1, wherein the precision blocks creator is configured to:

extract relevant information from the plurality of information blocks based on a contextual pattern;

summarize the extracted information to create the one or more micro content blocks; and tag the one or more micro content blocks with metadata related to the contextual pattern.

5. The information management server of claim 1, comprising a task manager configured to:

break down a workflow task into a series of micro-tasks;

schedule delivery of the one or more micro content blocks according to the series of micro-tasks; and notify the user about the status of micro content block delivery for each micro-task.

6. The information management server of claim 1, wherein the processing circuit is configured to:

time-stamp the one or more micro content blocks before transmission to the user device; and record the time-stamp in a blockchain ledger as part of the evidence of consumption.

7. The information management server of claim 2, wherein the trained machine learning model is configured to:

analyze historical data of user interactions with digital content;

identify patterns in content consumption across different user contexts; and predict future content consumption behavior based on the identified patterns.

8. The information management server of claim 1, comprising a filtering circuit configured to:

filter the plurality of information blocks based on a contextual pattern and processed context inputs;

remove redundant or irrelevant information from the filtered information blocks; and provide the filtered and refined information blocks to the precision blocks creator.

9. A method for blockchain-enabled management of digital content consumption, the method comprising:

receiving, by an information management server, context inputs from a user device;

determining, by an AI/ML (artificial intelligence/machine learning) system using a trained machine learning model, a contextual pattern associated with consumption of digital content based on the context inputs;

transmitting, by the information management server, at least one micro content block to the user device based on the contextual pattern;

identifying, by the information management server, a progress of a user through the digital content, wherein the progress is dependent on a plurality of predefined parameters comprising a number of words read by the user, a number of characters read by the user, and an amount of time spent by the user consuming the micro content blocks;

determining, by the information management server, a computer-executable progress score based on the identified progress;

assessing, by a validation appliance, a computer-executable genuineness score associated with consumption of the digital content by the user, wherein assessing the computer-executable genuineness score comprises:

continuously tracking, using a gaze tracking device, a gaze of the user through the digital content using an eye movement sensor to determine whether a particular portion of the digital content was consumed and to generate gaze information;

continuously monitoring, using a micro facial expression tracking device, micro facial expressions of the user through the progress of the digital content using a micro facial tracking software to detect changes in facial expressions indicative of attention levels and to generate micro facial expression information;

generating, by the validation appliance, computer-executable evidence of consumption of the micro content blocks based on the gaze information and the micro facial expression information in association with the computer-executable genuineness score;

defining, by the information management server, a computer-executable reward value for the user based on the computer-executable progress score and the computer-executable genuineness score upon the user achieving at least a defined level of progress;

instructing, by the information management server, the user to redeem the computer-executable reward value as an equivalent transactional amount upon submission of the progress;

generating, by a precision blocks creator, the at least one micro content block from a plurality of information blocks extracted from a database or from a plurality of distributed information sources; and storing, by a blockchain device through a plurality of blockchain-configured distributed access points over a blockchain network, the computer-executable evidence generated by the validation appliance in a blockchain database to create an immutable record of the consumption of the micro content blocks in association with the computer-executable genuineness score.

10. The method of claim 9, comprising:

analyzing, by the AI/ML system, extended context information including web browsing history and application usage during content consumption;

incorporating the extended context information into the contextual pattern; and adjusting the transmission of micro content blocks based on the incorporated extended context information.

11. The method of claim 9, comprising:

establishing, by the blockchain device, a federated blockchain comprising multiple entities and their associated devices;

defining access rights for each entity in the federated blockchain; and managing content consumption data sharing among the entities based on the defined access rights.

12. The method of claim 9, comprising:

generating, by the information management server, a private view of content consumption data for each entity in the blockchain network;

compartmentalizing the content consumption data based on the access rights of each entity; and auto-hashing the private views at predetermined intervals to ensure data integrity.

13. The method of claim 9, wherein generating the at least one micro content block comprises:

analyzing the contextual pattern to determine a complexity level appropriate for the user;

adjusting the content and format of the micro content block based on the determined complexity level; and structuring the micro content block to align with the identified progress of the user.

* * * * *